United States Patent [19]

Essex

[11] Patent Number: 4,757,979
[45] Date of Patent: Jul. 19, 1988

[54] TENSION REGULATING APPARATUS

[76] Inventor: Jimmie D. Essex, R.R. 2, Canton, Ill. 61520

[21] Appl. No.: 54,019

[22] Filed: May 26, 1987

Related U.S. Application Data

[63] Continuation of Ser. No. 855,901, Apr. 24, 1986, abandoned.

[51] Int. Cl.$^4$ .............................................. F16F 1/44
[52] U.S. Cl. ...................................... 267/71; 114/215; 267/153; 272/141
[58] Field of Search .................... 267/69, 70, 71, 72, 267/153; 114/205, 213, 215; 272/141, 135, 136

[56] References Cited

U.S. PATENT DOCUMENTS

| | | |
|---|---|---|
| 27,505 | 3/1960 | Wright .............................. 267/70 |
| 187,510 | 2/1977 | Carroll ............................. 267/70 |
| 412,113 | 10/1889 | Murphy . |
| 1,045,938 | 12/1912 | Brandt . |
| 1,189,396 | 7/1916 | Sheridan ...................... 272/141 X |
| 1,779,663 | 10/1930 | Cowell . |
| 2,037,728 | 4/1936 | Lillard ........................... 267/69 X |
| 2,364,081 | 12/1944 | Lambert . |
| 2,450,154 | 9/1948 | Osterhoudt ................... 267/69 X |
| 2,751,218 | 6/1956 | Pass, Jr. . |
| 2,991,524 | 7/1961 | Dobrikin . |
| 3,069,162 | 12/1962 | Samuel ........................ 272/135 X |
| 3,298,173 | 1/1967 | Empson . |
| 3,306,598 | 2/1967 | Jarret et al. . |
| 3,339,911 | 9/1967 | Strom . |
| 3,357,694 | 12/1967 | Kidder et al. ................ 267/70 |
| 3,869,114 | 3/1975 | Schneider . |
| 4,211,389 | 7/1980 | Frey et al. . |

FOREIGN PATENT DOCUMENTS

| | | |
|---|---|---|
| 1161994 | 9/1958 | France . |
| 347154 | 3/1937 | Italy . |
| 330240 | 7/1958 | Switzerland . |
| 6937 | of 1893 | United Kingdom . |

Primary Examiner—George E. A. Halvosa
Attorney, Agent, or Firm—Neuman, Williams, Anderson & Olson

[57] ABSTRACT

An apparatus for regulating tension by the compression of a yieldingly resisting core includes a compressible core, a collapsible modifier arranged in the core and a force transmitting or compressive member which receives a tension that is to be regulated and in response thereto applied a compressive force to the core. The core and modifier combine to initially generate a force in opposition to the compressive force applied to them, and the opposition force as applied to the compressive member causes the apparatus to develop a force in opposition to the applied tension. The modifier also aids the applied tension as the core is flattened.

3 Claims, 2 Drawing Sheets

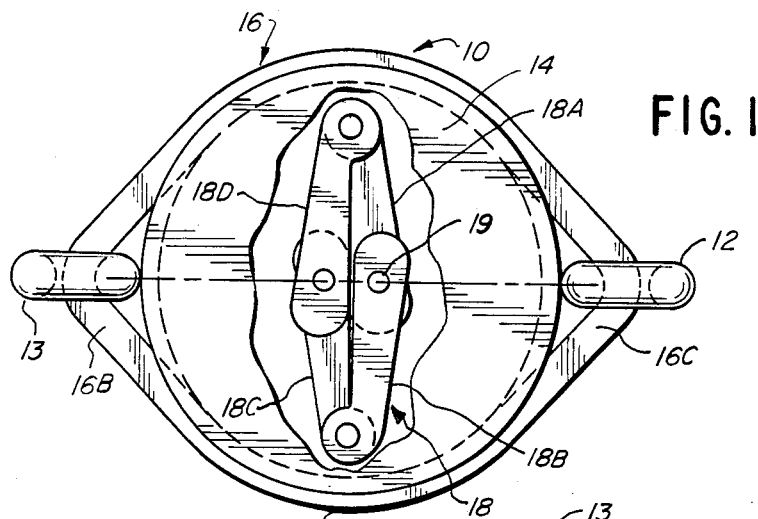
FIG. 1
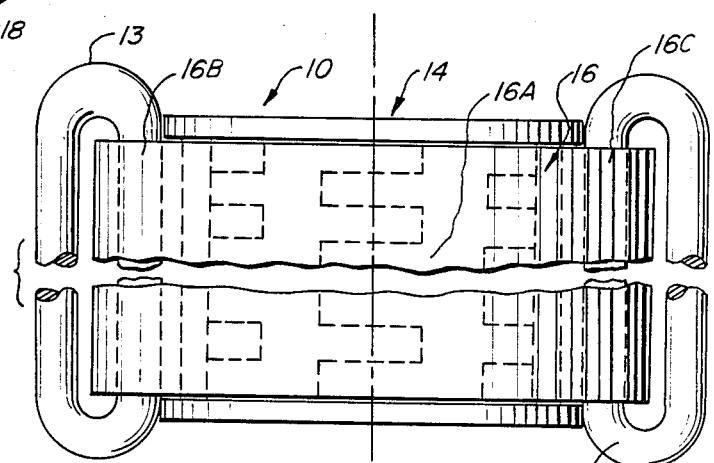
FIG. 3
FIG. 2
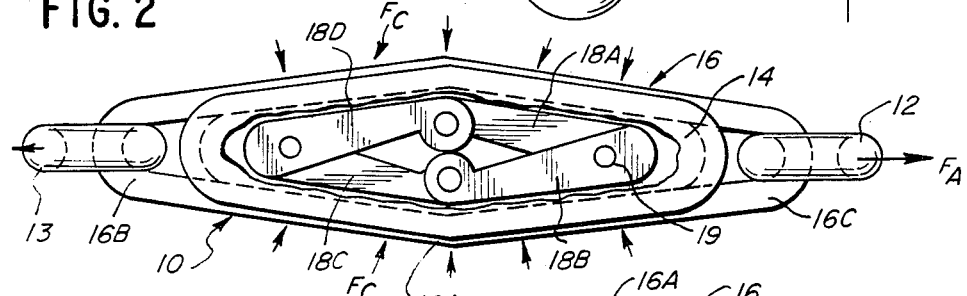
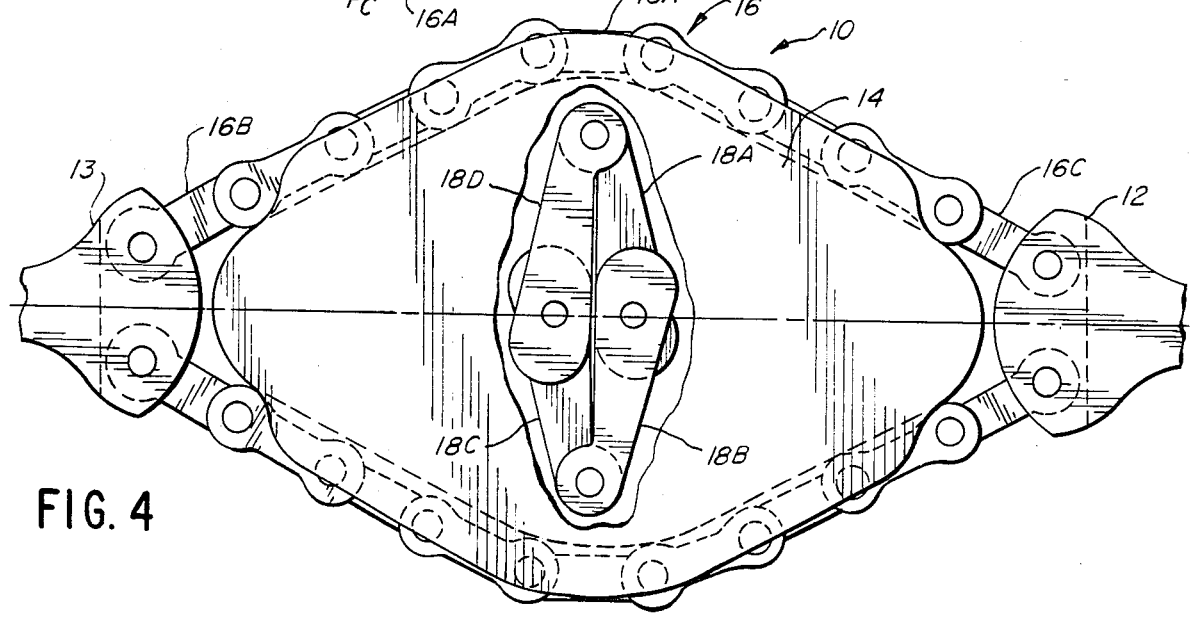
FIG. 4

TENSION REGULATING APPARATUS

This is a continuation of application Ser. No. 844,901 filed Apr. 24, 1986, now abandoned.

BACKGROUND OF THE INVENTION

The present invention relates generally to tension regulating devices for use in conjunction with tensioning members such as chains, ropes and the like, and, more specifically, to a tension modifier used in combination with a tension regulating device.

In many applications where a tension member such as rope or cable is used, for example, to transmit a tension force or to restrain cargo during transport, it is desirable to minimize the effect of a sudden increase or decrease of tension in the tension member. Where the tension member is operatively attached to an article or container; such as when the tension member is used in lifting or towing applications, a sudden change in the tension applied to the tension member may result in injury to the secured article or container or their contents.

Another shortcoming of tension members becomes apparent when the tension member is adapted to restrict or contain a force directed against the tension member. For example, in the shipping industry, cargo is commonly tied down or otherwise restrained during transport by the use of inelastic restraining means such as chain or cable. The usefulness of the tension member in this situation depends on its ability to develop and maintain a force in opposition to the force applied by the restrained cargo. However, a slight decrease in the applied force often renders an inelastic tension member ineffective. Moreover, owing to the inelasticity of these restraining means and, as in the case of chain, the discrete nature of the adjustability, it is very difficult to initially secure the restraining means under satisfactory tension. Too, during transport, the cargo itself may settle or shift, thereby causing the restraining means to loosen or shift further. All of these situations may result in damage to or loss of the cargo. Even when the restraining means is adequately tensioned and positioned to restrain the cargo, it has no shock absorption properties to protect the cargo during transport.

Where the tension member is somewhat extensible, such as with rope or web strapping, some of the abovedescribed problems are alleviated inasmuch as an extensible restraining member may be initially adjusted to an adequate tension more easily. Used as a restraining means, an extensible tension member may also be pre-tensioned to compensate for a subsequent shift in the restrained cargo. However, the tension member by itself, even if extensible, offers minimal shock protection, and under a continuous load it may inelastically stretch and become loose, with the result that cargo may be damaged during transport because of inadequate restraint.

Conventional tension regulating devices that were designed to address the problems inherent in the use of tension members have generally been of a series spring construction or variations thereof. That is, a spring or other elastic member is inserted in line with a tension member to regulate the effect of a sudden change in the applied tension or, where the elastic member is pretensioned in restraining applications, to compensate for a shift or lengthening of the tension member by maintaining a somewhat uniform tension therein. This type of regulating device has several disadvantages, however.

Owing to the series arrangement of the elastic member, tension regulation is accomplished by a change in the length of the regulating device as the elastic member stretches or contracts to counter a change in the applied tension. In many application, it is undesirable that the combined length of the tension member and the regulating device vary significantly.

Further, if the applied tension is too great, the regulating device may be stretched to a point where it deforms and loses its elasticity. To prevent this latter occurrence, some conventional tension regulating devices include a section of inextensible material secured across the elastic portion. The length of the inextensible section is such that at applied tensions which would deform the elastic portion, the inextensible section is pulled taut and bears most of the applied tension. Since the inextensible section has no tension regulating characteristics, the entire device becomes ineffective to regulate tension at large applied tensions.

SUMMARY OF INVENTION

The present invention is a tension regulating apparatus that may be inserted in line with a tension member to provide the tension member with elasticity in order to overcome the above-noted disadvantages inherent in the use of tension members. Additionally, owing to its unique mode of operation, the present invention is not so susceptible to the drawbacks of conventional tension regulating devices.

The invention includes a core that is adapted to resist a compressive force applied to it. Compressive members are attached to a tension member and apply a compressive force to the core in response to a tension being exerted on the tension member. The resistive or reaction force generated by the core is transmitted to the compressive members which act to develop a force in opposition to the tension applied to the tension member. A modifying means is present in the core in order to further regulate the tension. The modifier acts to initially transmit a further resistive force to the compressive members in order to provide greater tension resistance upon the initial application of tension to the tension member. As the core is gradually compressed, and compression of the core becomes progressively more difficult, the modifier, being acted upon by this movement and pressure, is forced through a transition of leverage which initially aids in the compressive resistance of the device and then through the leverage transition, provides a responsive force which aids the tension through elongation, providing a smoother response.

It is an object of the present invention to overcome the above-described problems associated with the use of tension members by providing an apparatus for regulating a tension applied to the tension member.

It is another object of the present invention to provide a tension regulating apparatus that is superior to conventional tension regulating devices.

It is another object of the present invention to provide a tension regulating apparatus that is subject to minimal elongation during operation.

It is yet another object of the present invention to provide a tension regulating apparatus that is compact and lightweight.

It is a further object of the present invention to provide a tension regulating apparatus that is of simple and economical construction.

It is still another object of the present invention to provide a tension regulating apparatus that is adaptable for use over a wide range of applied tension.

It is still another object of the present invention to provide a tension regulating apparatus that may be controlled to actively effect tension regulation.

It is a further object of the present invention to provide a tension regulating apparatus having a modifying means which acts to further regulate and smooth the resistive force supplied by the invention.

Still further objects, features and advantages of the present invention will become readily apparent to one skilled in the art from consideration of the description of the invention, the accompanying drawings and the appended claims.

DESCRIPTION OF THE DRAWINGS

FIG. 1 is an elevational view of an embodiment in accordance with the present invention shown in its untensioned state.

FIG. 2 is an elevational view of the embodiment shown in FIG. 1 as it is subject to an external tension force.

FIG. 3 is a top view of the embodiment shown in FIG. 1.

FIG. 4 is an elevational view of another embodiment in accordance with the present invention, where the compressive members comprise lengths of chain.

DESCRIPTION OF THE INVENTION

Figure 5:
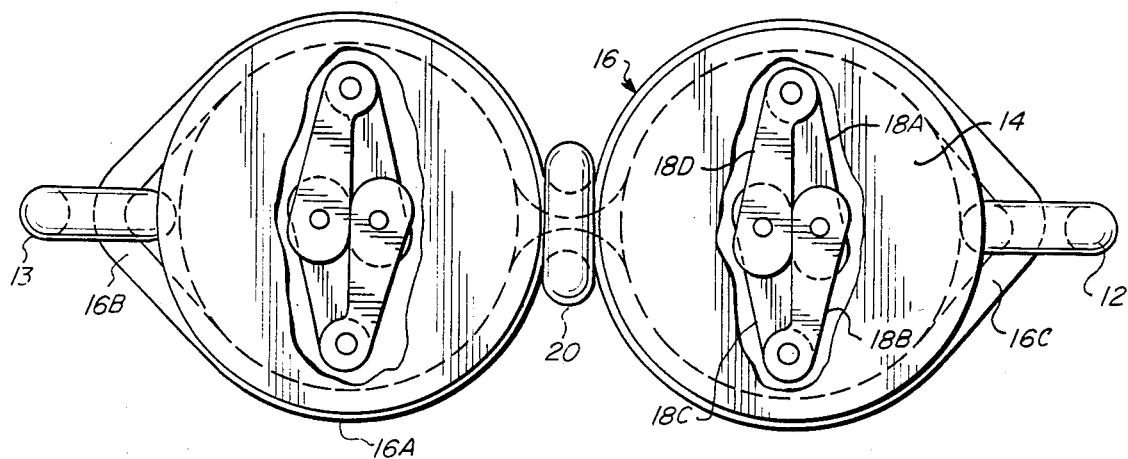
FIG. 5 is an elevational view of another embodiment in accordance with the present invention, where two tension regulating devices are connected serially and are shown in an untensioned state.
Figure 6:
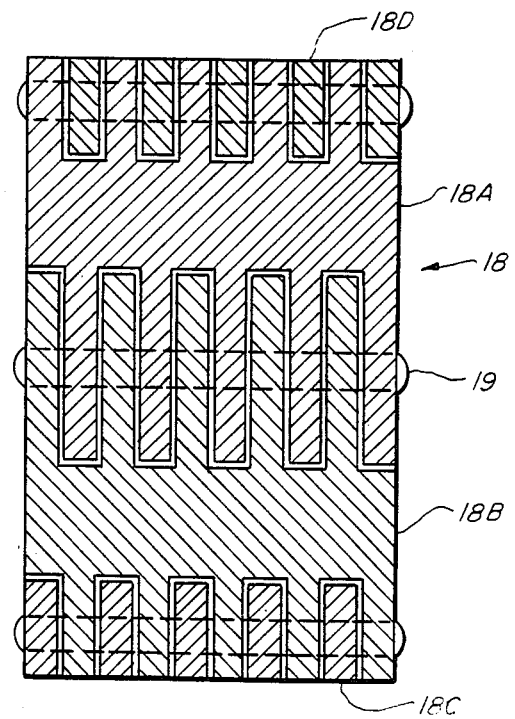
FIG. 6 is a sectional view of one embodiment of a modifier means in accordance with the present invention.

The invention will be described by way of examples with reference to FIGS. 1-6, in which like numbers designate corresponding items or portions. The Figures depict various embodiments of a tension regulating device 10 operable in accordance with the present invention. The tension regulating device 10 consists of a compressible core 14, a modifier means 18 and a compressive means 16. The compressive means is operatively secured to the connecting links or ends 12, 13 and generally circumferentially surrounds the core. A tension $F_A$ may be applied to the device (FIG. 2) by way of a tension member (not shown) connected to one of the links 12, 13. The other link may be directly connected to an article to which the regulated tension is to be ultimately applied, it may be connected to another tension member, as where a tension member is severed to allow the insertion of the tension regulating device 10, or it may be used to join two tension members. When a tension for $F_A$ is exerted upon the device 10, the applied tension is regulated by virtue of compression of the core 14 rather than by extension of an elastic member as in conventional tension regulating devices.

The compressible core 14 may be formed of an inelastically deformable material that can be compressed only once, or the core preferably may be formed of live rubber or another resilient material such as urethane or neoprene. When a compressive force applied to a resilient core is released, the core will return to its substantially uncompressed shape, which may be circular as shown in FIG. 1 or any other shape. The only requirement placed on the shape of the core 14 is that it separate the compressive means 16 between the links 12, 13 in order to provide the leverage by which the tension regulating device operates. The density, size and shape of the core 14 are selected to achieve the desired sensitivity of the regulating device 10. The core may even be formed to include apertures or sections composed of different materials having differing physical characteristics, thereby providing a linear or nonlinear response to the applied tension, as necessary or desirable.

Additionally, the core 14 can be constructed to exhibit a high resistance to compression so that only a relatively small compression of the core would occur at the maximum applied tension. Consequently, the overall length of the tension regulating device is not significantly increased by the applied tension. This is in contrast to some conventional tension regulating devices that depend for their operation on the substantial elongation of a series spring or elastic member to regulate the applied tension.

The modifier means 18 is located within the core 14 so that it affects the response of the core to compression. In a preferred embodiment, the modifier means includes segments 18A, 18B, 18C and 18D which are connected at their ends by pins 19. The segments are preferably rigid, of equal length, and connected to form a parallelogram structure. The pin or hinge connection allows flexibility in the modifier; preferably, there is no core material between the segments 18A-D. The segments may be constructed of molded plastic, formed steel or cast iron. The box-like parallelogram structure of the modifier 18 is shown more fully in sectional view in FIG. 6. The box-like form allows greater distribution of the forces across the width of the modifier. The width of the modifier 18 is preferably the approximate width of the core 14. The precise shape of the modifier 18 is not critical as long as it provides the desired response of the core to compression.

The compressive means 16 generally circumferentially surrounds the core 14 so that a tension applied to the connecting links 12, 13 tends to collapse the compressive means and compress the core 14. The compressive means includes a mid-portion 16A and terminal segments 16B, 16C generally diametrically disposed for attachment to the connecting links 12, 13. The terminal segments are preferably located substantially colinearly with respect to the line of the applied tension force at connecting means 12, 13 to maximize the operating efficiency, although their location and configuration may be altered as necessary or desirable. For example, FIG. 1 illustrates a one-piece compressive means wherein the terminal segments 16B, 16C are provisionally located by placement of the connecting means 12, 13 along a diameter D through the core 14. However, when a force $F_A$ is applied, as illustrated in FIG. 2, the location of the connecting means 12, 13 may change slightly in response to the magnitude of the force and the shape of any surface against which the tension device 10 may be resting. As a still further alternative, the connecting means 12, 13 may be fixed to the terminal segments 16B, 16C, as illustrated in FIG. 4, either as necessitated by the nature of the compressive means 16 or as desirable depending upon a particular application. The presence of the modifier 18, as shown in FIG. 1, regulates the resistance of the core 14 to the force of the compressive means 16. In this manner, the modifier 18 provides a smoother resistance to the applied tension.

The compressive means 16 may either be inelastic or have a predetermined amount of elasticity to aid in the absorption of an applied tension force. As illustrated in FIGS. 1–3 and 5, the compressive means may be a strap or webbing that is sufficiently flexible to conform to the shape of the core in both its rest and tensioned states and convert a tension applied at the terminal segments thereof into a compressive force to compress the core 14. It is to be understood that a variety of materials are suitable for this use. For example, FIG. 4 shows an embodiment which utilizes lengths of chain as the compressive means 16. The compressive portion 16 may further be formed of a plurality of sections placed in parallel around the core, or it may be a single section enveloping the core as, for example, when the core is of a spherical shape.

The connecting means 12, 13 may be any suitable item for attaching a tension member to the tension regulating device 10. In FIGS. 1–3 and 5, the connecting means is an oblate loop, such as a link from a log chain, that encircles the compression means and provides sufficient space to attach a tension member In FIG. 4 it comprises a yoke that secures chain link terminal segments 16B, 16C. The connecting means may be any desirable shape provided that it acts to collapse the compressive means when placed under tension.

The tension member applying a force $F_A$ to the tension regulating device 10 may consist of any member suitable to transmit a tension force; for example, web or metal strapping, chain, cable, or rope. If the tension member is inextensible, tension regulation is accomplished entirely by the operation of the tension regulating device 10. Tension members that are somewhat extensible or elastic, such as web strapping or rope, aid in the regulation of an applied tension, but are usually unsatisfactory to be used alone owing to their limited elasticity and inability to be controlled. The tension member may be secured to the tension regulating device 10 by one of the connecting links 12, 13 as described, or in any manner which allows the tension force exerted on the tension member to be transmitted to the compressive means 16 and thus the core 14. The tension member may even be of a multi-layered construction, wherein the layers are separated for a length to accommodate the core 14, and thereby also function as the compressive means 16.

FIG. 2 shows the embodiment of FIG. 1 during operation when a tension is applied to the device 10 through a tension member (not illustrated) attached to the link 12. Link 13 may be attached to an item to be secured or an end of another tension member. During operation, a tension $F_A$ applied to the tension member is transmitted to the link 12 and the compressive means 16, tending to draw together the compressive means 16 and thereby exert a compressive force $F_C$ upon the core 14 and modifier 18. The compressive force $F_C$ will compress the core 14, activating the modifier 18, causing the core and modifier to generate an opposite force. This opposing force is applied to the compressive means 16, which responds by resisting the applied tension for $F_A$. In this way, an applied tension $F_A$ is regulated by the device 10 and in particular by the opposing force generated as a result of the reaction of the core 14 and modifier 18 to a compressive force applied to it.

At the initial stage of compression, shown in FIG. 1, the modifier provides its greatest resistance to movement. This assists the core in resisting compression. As the modifier 18 reaches the flattened stage of FIG. 2, the modifier tends to aid, rather than resist the compression of the core. At this stage, the modifier tends to lengthen at a rate greater than the unmodified extension of the core 14 near terminal segments 16B, 16C. The modifier then exerts its greatest force in the line of the tension force $F_A$, and aids the tension force $F_A$ in compressing the core 14.

The presence of the tension regulating device 10 in line with a tension member serves to smooth out a sudden impulse applied to the tension member. Where the device 10 is attached to an article at link 13, the article and its contents, if any, are protected against sudden jarring which may damage the article and its contents. When a sudden impulse is exerted on the tension member, the force is transmitted to the core 14 by the compressive means 16, and the core compresses as it absorbs a portion of the energy imparted by the impulse. The tension force that is actually exerted on the article or tension member attached to link 13 is thus regulated by the device 10 which serves as a shock absorber to smooth out sudden increases in tension. Conversely, during a sudden decrease in tension, a resilient core exhibits a self-damping characteristic which tends to smooth out the sudden removal of a tension force.

The response of the modifier 18 in the core provides an even smoother reaction to a sudden change in the tension of the tension member. When a sudden impulse is exerted on the tension member, the modifier aids the core 14 in initially absorbing energy and resisting the applied tension. As the core compresses, the modifier responds and lengthens at a greater rate than the core, and thus exerts a force which aids the applied tension. The overall effect is a much smoother regulation of tension throughout all stages of operation.

The action of the tension regulating device 10 may be progressive, although its characteristics may be altered by changing the core, its composition, or its configuration, or by changing the configuration or composition of the modifier. As the core 14 becomes increasingly compressed by a growing applied tension force $F_A$, an overall increasing opposing force is developed by the core and modifier 18 resulting in a growing force in opposition to the applied tension force. With the appropriate choice of core, modifier and construction, the device 10 can be made to be responsive to a very small applied tension or operable through extremely large applied tensions. The transformation of an applied tension force to a compressive force is here seen to be an important characteristic of the present invention. Tension regulating devices that operate to regulate an applied tension through the use of series spring or elastic member have a well defined limit of operation. Applied forces beyond this limit would destroy the device, deform it so that it no longer is useful, or extend it beyond its elastic limits so that it functions as a solid link. By transforming the applied tension force into a compressive force to be applied to the core of the device, the present invention can be operated at higher applied tensions than a comparably sized series spring or elastic regulating device.

The present invention may also be arranged in parallel or series with a number of other devices of its kind to have an overall increase in tension regulation ability. FIG. 5 shows such an arrangement, which includes two tension regulating devices 10 serially connected. Each of the tension regulating devices comprises a compressible core 14, modifier means 18 and a compressive means 16 as generally described with respect to FIG. 1. In this embodiment, one compressive means 16 actually surrounds both of the cores and is pinched by link 20 at a point between the two cores to promote independent operation of each of the cores.

It is thus seen that exemplary embodiments of the present invention have been disclosed which meet each of the aforementioned objectives. It will also be readily apparent to those skilled in the art and having the benefit of the foregoing teachings that many variations of, and modifications to, the disclosed example may be made without departing from the spirit and scope of the invention.

What is claimed is:

1. An apparatus for regulating a tension applied thereto comprising:

a compressible core means for yieldingly resisting a compressive force applied thereto, the resistance generated by said core means generally progressively increasing between an uncompressed state of the core means through a maximally compressed state of the core means;

connecting means generally diametrically disposed proximate the periphery of said core means and defining a line of force;

compressive means attached to said connecting means and generally circumferentially surrounding said core means such that a tension applied to the connecting means operatively compresses the core means through the collapse of said compressive means; and a passive modifier means disposed entirely within the core means and responsive to the compression of said core means for modifying the resistance of said core means to an applied tension, said modifier means comprising four rigid segments and means for hingedly securing said segments at the ends thereof to form a parallelogram structure, each of said segments having at least some portion thereof in direct physical engagement with said core means, the hinged rigid segments of said parallelogram structure being disposed in a first confronting relation in a substantially closed configuration along a first line substantially perpendicular to said line of force when the core means is in its uncompressed state, and said hinged rigid segments of said parallelogram structure being responsive to the compression of the core means to move through an open parallelogram configuration to a second confronting relation in a substantially closed configuration along a second line substantially parallel to said line of force as the core means is compressed, whereby the modifier means acts to assist the core means in resisting compression of the core means as the core means begins to be compressed from the uncompressed state and acts to assist compression of the core means as the core means becomes maximally compressed.

2. An apparatus for regulating a tension applied thereto, comprising:

a compressible core means for yieldingly resisting a compressive force applied thereto, the resistance generated by said core means generally progressively increasing between an uncompressed state of the core means through a maximally compressed state of the core means;

compressive means responsive to the applied tension for applying a compressive force to said core means and responsive to the opposing force generated by said core means for generating a force in opposition to the applied tension, said tension being applied along a line of force; and modifier means disposed entirely within the core means and responsive to yielding of said core means for modifying the resistance of said core means to an applied tension, said modifier means comprising four rigid segments and means for hingedly securing said segments at the ends thereof to form a parallelogram structure, each of said segments having at least some portion thereof in direct physical engagement with said core means, the hinged rigid segments of said parallelogram structure being disposed in a first confronting relation in a substantially closed configuration along a first line substantially perpendicular to said line of force when the core means is in its uncompressed state, said hinged rigid segments of said parallelogram structure being responsive to the compression of the core means to move through an open parallelogram configuration to a second confronting relation in a substantially closed configuration along a second line substantially parallel to said line of force as said core means is being compressed, whereby the modifier means acts to assist the core means in resisting compression of the core means as the core means begins to be compressed from the uncompressed state and acts to assist compression of the core means as the core means becomes maximally compressed.

3. An apparatus for regulating a tension applied thereto, comprising a compressible core means for yieldingly resisting a compressive force applied thereto, the resistance generated by said core means generally progressively increasing between an uncompressed state of the core means through a maximally compressed state of the core means;

a compressive means responsive to the applied tension for applying a compressive force to said core means, and responsive to an opposing force generated by said core means for generating a force in opposition to the applied tension; and a modifier means disposed entirely within the core means and responsive to yielding of said core means for modifying the resistance of said core means to an applied tension, said modifier means comprising at least four rigid segments and means for hingedly securing said segments at each end thereof to form a prarllelogram structure, each of said segments having at least some portion thereof in direct physical engagement with said core means, the hinged rigid segments of said parallelogram structure being disposed in a first confronting relation in a substantially closed configuration along a first line when the core means is in its uncompressed state, said hinged rigid segments of said parallelogram structure being responsive to the compression of the core means to move through an open parallelogram configuration to a second confronting relation in a substantially closed configuration along a second line as said core means is being compressed, whereby the modifier means acts to assist the core means in resisting compression of the core means as the core means begins to be compressed from the uncompressed state and acts to assist compression of the core means as the core means becomes maximally compressed.

* * * * *